June 14, 1949.  W. E. BLEDSOE, JR  2,473,049
ELECTRIC MOTOR
Filed July 30, 1948
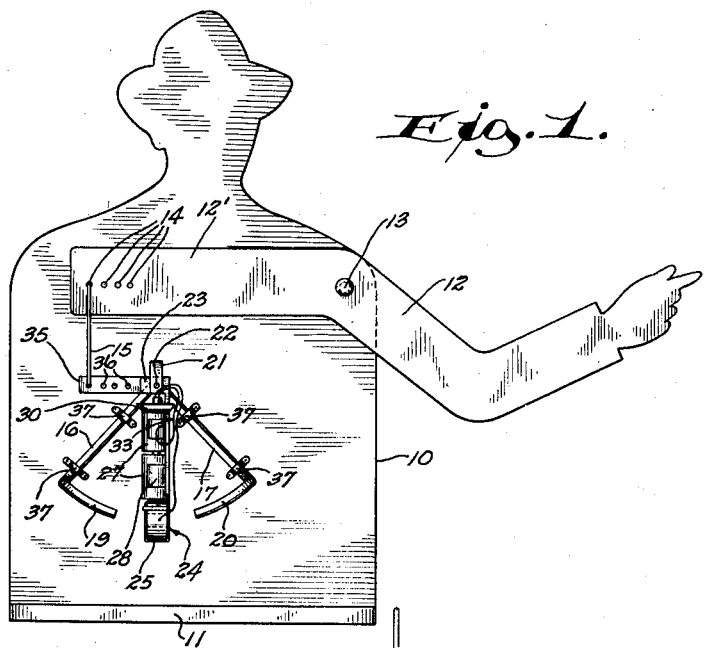
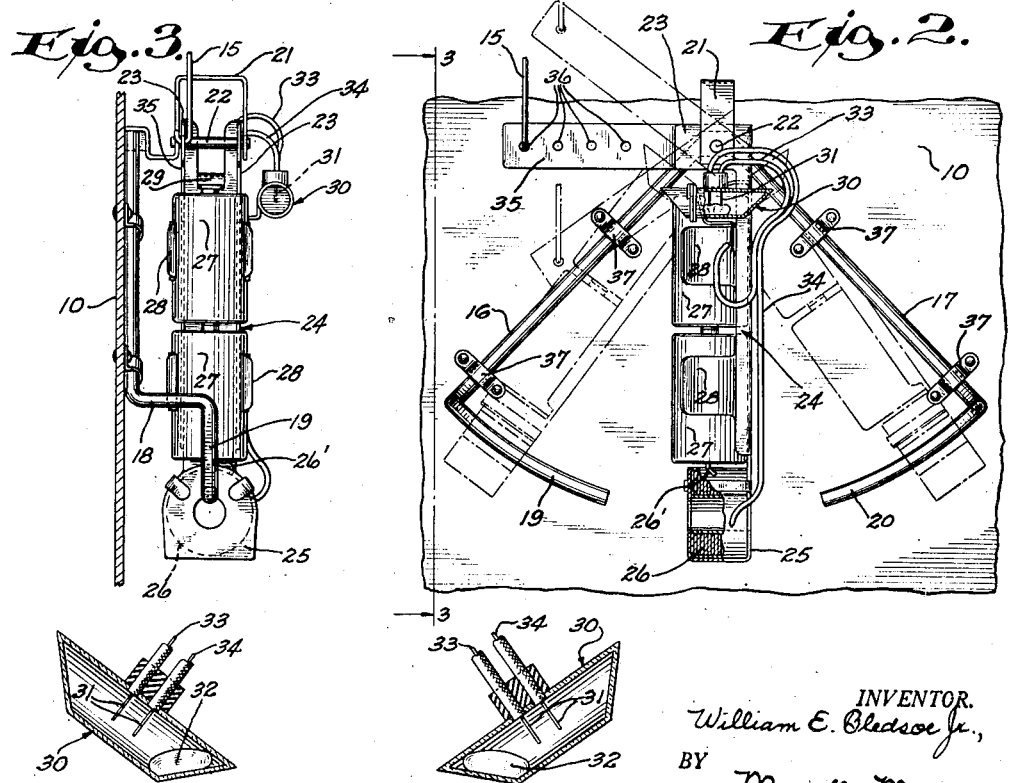
INVENTOR.
William E. Bledsoe Jr.,
BY Morsell & Morsell
ATTORNEYS.

Patented June 14, 1949

2,473,049

UNITED STATES PATENT OFFICE 2,473,049

ELECTRIC MOTOR

William E. Bledsoe, Jr., Milwaukee, Wis., assignor to Badger Carton Co., Milwaukee, Wis., a corporation of Wisconsin Application July 30, 1948, Serial No. 41,541

8 Claims. (Cl. 172—126)

This invention relates to improvements in electric motors, and more particularly to a dry cell operated electric motor.

Simple and inexpensive electric motors are utilized for operating the moving parts of animated advertising display cards or signs. It is conventional practice to provide for this purpose small electric motors receiving their energy from convenient electric power lines, but motors of this type for use in the field in question are objectionable because current in all localities is not uniform, the motors are expensive to operate, and they can only be used where there is a convenient electric outlet with which the motor may be connected.

Dry cell operated motors for use with animated advertising displays are also available, but conventional dry cell operated motors have limitations in respect to the power generated, the drain on the dry cells, the necessity of replacing the same, difficulty in keeping such motors in balance and the fact that the same are bulky due to the incorporation in the mechanisms of the dry cells.

With the above in mind, it is a primary object of the present invention to provide a dry cell operated motor, especially suited for use in connection with animated advertising displays, which eliminates the objections inherent to conventional dry cell operated motors through an arrangement which is compact but able to generate substantially greater power than conventional dry cell motors, and which is at all times in proper balance.

A further object of the invention is to provide a dry cell operated electric motor wherein motion is obtained from a swinging pendulum which carries a coil and moves between a pair of armatures because of alternate momentary energization of the pendulum-carried coil, whereby the major movement of the pendulum results from gravity and does not drain the dry cells.

A further object of the invention is to provide a dry cell operated electric motor of the character described having the dry cells, coil and controlling switch all mounted on the swinging pendulum unit which makes for a compact assemblage, adds weight to the pendulum, thereby increasing the power of the latter, and which is devoid of moving wires.

A further object of the invention is to provide a dry cell operated electric motor which can use any of the standard sizes of dry cell batteries, in any number, depending on the size of the motor and the animated display to be operated thereby.

A further object of the invention is to provide a dry cell operated motor in which a novel type of rocking, double contact switch is mounted directly on the swinging pendulum unit with the latter automatically functioning to close the circuit to the batteries only momentarily on each swing of the pendulum unit in each direction, thereby insuring extremely long life for the dry cells.

A further object of the invention is to provide a dry cell operated electric motor which is of very simple construction, is automatic in operation and requires no attention, which is inexpensive to manufacture and operate, which can be compactly mounted in a concealed relation on the rear of an animated advertising display, and which is well adapted for the purposes set forth.

With the above and other objects in view, the invention consists of the improved electric motor, and its parts and combinations as set forth in the claims, and all equivalents thereof.

In the accompanying drawing, in which the same reference characters indicate the same parts in all of the views:

Fig. 1 is a rear view of an animated advertising display card with the improved electric motor mounted thereon and operatively connected with a movable part of the display card;

Fig. 2 is an enlarged fragmentary view of the rear of the display card having the electric motor mounted thereon, with portions of the latter broken away and in section, there being broken line showings of the motor pendulum unit in its opposite positions;

Fig. 3 is a vertical sectional view taken on line 3—3 of Fig. 2;

Fig. 4 is an enlarged detail sectional view of the rocking, double contact switch in one extreme position; and Fig. 5 is a similar, enlarged detail sectional view of the rocking, double contact switch in its opposite position.

The improved dry cell operated motor is herein illustrated and described in association with an animated advertising display. The invention is not to be limited thereto, however, because the improved motor is susceptible of use in other environments and for other purposes.

By way of illustration, an animated display may comprise a relatively large upright card member 10 mounted on a horizontal base 11 or other suitable means for holding the card portion 10 in a relatively vertical position. The card portion 10 may have any desired configuration to suit the product being advertised, and the front or outer surface thereof (the reverse of that shown in Figs. 1 and 2) may have suitable material delineated or outlined thereon. In the exemplification shown in Fig. 1, merely by way of example, the card 10 is intended to represent the head and torso of a man. Intermediately pivotally associated with the card 10 is an oscillatable member 12, which in the present embodiment simulates a human arm and hand and is intended to pivot upwardly and downwardly on the connection 13 to give animation to the display or card and will represent a man moving his arm as in pointing or emphasing. An extended portion 12' of the arm 12 overlaps the rear or reverse side of the card 10 and is provided with a line of apertures 14, a selected one of which is pivotally engaged by the turned end portion of a connecting link 15. The latter, as will hereinafter appear, transmits oscillatory movement from the motor to the movable element 12 of the animated display.

The improved dry cell operated motor, as will best appear from Figs. 1 and 2, comprises downwardly and outwardly diverging magnetic metal bars 16 and 17 having right angular leg portions 18 and armature extensions 19 and 20. The latter are at right angles to the leg portions 18 and are therefore outwardly offset relative to their respective metal bars 16 and 17. The armatures 19 and 20 are curved and lie along the arc of swinging movement of the lower end of a pendulum unit, as will hereinafter appear. Also, the armatures 19 and 20 have their free ends substantially spaced apart.

Affixed to the apex of the bars 16 and 17 is an upturned bracket 21 in which is journalled a shaft or pin 22 having mounted fast thereon the angularly turned upper arm portions 23 of the frame of a normally vertically disposed pendulum unit designated generally by the numeral 24, the latter being formed of metal. The lower end portion of the pendulum frame 24 is formed as a housing 25 to enclose a solenoid coil 26. There are openings in the walls of the housing 25 registering with the axial opening in the coil, with all of said openings lying along an arc which would include the armatures 19 and 20. From what has been described thus far, it will be obvious, therefore, that the pendulum frame 24 swings on the axis of pivotal mounting of the shaft 22 and the arrangement of the parts is such that the swing of the pendulum frame in both directions causes the solenoid coil to receive and move along both of the armatures, alternately, in the manner shown in broken lines in Fig. 2.

Above the housing 25 and solenoid coil 26, the pendulum frame 24 supports superimposed dry cells 27, the pendulum frame being provided with yielding clip portions 28 for releasably embracing the mounted dry cells. In the embodiment illustrated, two relatively small standard dry cells are shown mounted in the pendulum frame, but within the contemplation of the invention the pendulum frame may be of a size to mount any desired number of superimposed dry cells of any desired standard size. It will be observed, particularly from Fig. 2, that one end portion 26' of the solenoid coil windings is engaged with the terminal on the base of the lowermost dry cell 27. The latter has its upper terminal in engagement with the base terminal of the battery thereabove and the top terminal of the uppermost dry cell is engaged by a spring metallic clip 29 carried by the pendulum frame.

Mounted fast on an upper portion of the pendulum frame 24 and positioned so as to be horizontal or level only when the pendulum frame is in its vertical intermediate position, is a double contact switch indicated generally by the numeral 30 and of a character so as to rock and automatically operate upon swinging movements of the pendulum arm. While the rocking double contact switch 30 may in practice take many different forms, it must include a pair of separated contact elements 31 arranged to be connected or bridged so as to close the circuit only when the rocking switch 30 passes its horizontal or intermediate position during each swing of the pendulum frame. In the present embodiment, the switch 30 includes a hollow glass tube into a central portion of which the contact elements 31 project and also containing a mass of mercury 32. If it be assumed that the pendulum has swung to the left relative to Figs. 1 and 2, then the switch tube will have assumed the position in Fig. 4 wherein the mercury mass 32 gravitated to the lower end of the tube free of the contact elements, producing an open electrical circuit. The opposite condition is attained when the pendulum frame swings to the right relative to Fig. 2, causing the switch tube to assume the position of Fig. 5 wherein the mercury mass 32 will have gravitated to the opposite end of the tube, which is then the lowest, being free of the contact elements 31 and producing an open electrical circuit. However, during the swing of the tube from the position of Fig. 4 to the position of Fig. 5, and vice versa, gravity will cause the mercury mass 32 to engage both of the contact elements 31 to momentarily close the electrical circuit. This will occur at such time as the coil approaches the adjacent armature.

Attached to the contact elements 31 of the switch are circuit wires 33 and 34. One of the same, as wire 33, is grounded on the pendulum frame 24, and the other circuit wire, as 34, extends down the pendulum frame and is attached to the solenoid coil 26.

One of the angularly turned upper arm portions 23 of the pendulum frame has an extension 35 which of course oscillates in a vertical plane when the pendulum frame swings on its pivotal axis 22. The extension 35 is also provided with a spaced series of apertures 36 and a selected aperture is pivotally engaged by the angular lower end of the previously mentioned connecting link 15 whereby back and forth swinging movement of the pendulum oscillates the arm or movable element 12 of the animated display.

The dry cell operated motor is relatively small and compact and can be mounted on or relative to the animated display in any desired manner. In the present embodiment, brackets 37 engaging the metal bar 16 and 17, mount the motor directly on the backside of the card portion 10 of the animated display.

The normally open electrical circuit includes, of course, the dry cells 27, the coil 26 and the separated contact elements 31 in the rocking switch 30. To set the motor into operation, it is only necessary to manually initiate swinging movement of the pendulum frame 24. Then, the rocking switch 30 automatically functions each time the pendulum unit passes its vertical position to momentarily close the circuit to the coil 26, energizing the latter. The energization of the coil will cause it to attract the armature 19 or 20, depending upon the direction of swing of the pendulum unit, and this will draw the pendulum unit to the armature in question. However, the circuit to the coil will be immediately broken upon further swing of the pendulum frame so that in effect the pendulum swings back and forth after the initial manual impulse given thereto, mainly by gravity, by the momentary energization of the coil upon each swing of the pendulum in each direction sustains the swinging movement of the pendulum frame with a minimum of drain on the dry cells. The movement of the pendulum frame will thus continue unless the movement of the pendulum frame is manually arrested or unless the dry cells give out. The continuous back and forth swinging movement of the pendulum frame is utilized to transmit a desired type of continuous motion to any element to be operated, as for instance, the oscillatable arm in the animated display embodiment shown in Fig. 1.

It will be appreciated that the improved electric motor is devoid of limitations as to the location in which it may be used. It is not dependent upon the location or an electric current outlet, nor does it need wires extending therefrom. The improved motor operates through a swinging pendulum carrying a coil which attracts the armatures and is periodically momentarily energized. The coil, dry cells and switch are all compactly mounted on the swinging pendulum unit, eliminating any outside wiring, with the further advantages that weight is added to the pendulum unit whereby the power of the same is increased. The improved electric motor is inexpensive to manufacture and operate and is well adapted for the purposes described.

What is claimed as the invention is:

1. An electric motor, comprising an oscillatable pendulum, an electric coil carried by the pendulum, a battery also carried by the pendulum and electrically connected with the coil, an armature arranged in the path of swinging movement of the coil and establishing a relative attraction between the armature and coil when the latter is energized, and means effective during the swinging movement of the pendulum to energize and deenergize the coil.

2. An electric motor, comprising an oscillatable pendulum, an electric coil carried by the pendulum, a battery also carried by the pendulum, a normally open electrical circuit including the coil and battery, an armature arranged in the path of swinging movement of the coil and establishing a relative magnetic attraction between the armature and coil when the latter is energized, and means automatically effective during a certain swinging movement of the pendulum to momentarily close said circuit and energize the coil.

3. An electric motor, comprising an oscillating pendulum, a solenoid coil carried by a lower portion of the pendulum, a pair of spaced armatures lying along the arc of movement of the solenoid coil, a battery carried by the pendulum, an electric circuit including said coil and battery, and a switch carried by the pendulum and included in said electrical circuit and automatically operated by certain movements of said pendulum for controlling said circuit to energize and deenergize said coil for causing relative attraction between the solenoid and an armature whereby an impulse is given to the swinging movement of the pendulum.

4. In combination, a support, a pendulum, means mounting the pendulum on the support for swinging movement to and fro, an electric coil carried by a lower portion of the pendulum, a pair of spaced armatures fixedly mounted relative to the pendulum along the arc of movement of said coil, a dry cell carried by the pendulum, a normally open electrical circuit including the coil and dry cell, a switch included in said circuit and automatically operated by a swinging movement of the pendulum, and a motion transmitting extension connected to and operated by the pendulum.

5. In combination, a support, a pendulum, means mounting the pendulum on the support for swinging movement to and fro, an electric coil carried by a lower portion of the pendulum, a pair of spaced armatures fixedly mounted relative to the pendulum along the arc of movement of said coil, a dry cell carried by the pendulum, a normally open electrical circuit including the coil and dry cell, a rocking switch mounted on said pendulum and included in said circuit, said switch operating automatically to momentarily close said circuit during a certain swinging movement of the pendulum, and a motion transmitting extension connected to the pendulum, and operated by swinging movements of the pendulum.

6. In combination, a support, a pendulum, means mounting the pendulum on the support for swinging movement to and fro, an electric coil carried by a lower portion of the pendulum, a pair of spaced armatures fixedly mounted relative ot the pendulum and lying along opposite extremities of the arc of movement of said coil, a dry cell carried by the pendulum, a normally open electrical circuit including the coil and dry cell, a double contact, rocking switch included in said circuit and mounted on said pendulum and automatically operated by a swinging movement of the pendulum to momentarily close and then open said circuit, and a motion transmitting extension connected to and operated by the pendulum.

7. In combination, a portion of an animated display card forming a support, a pendulum, means mounting the pendulum for swinging movement to and fro relative to a face of the display card, an electric coil carried by a lower portion of the pendulum, a pair of spaced armatures fixedly mounted relative to the pendulum along the arc of movement of said coil, a dry cell carried by the pendulum, a normally open electrical circuit including the coil and dry cell, a switch mounted on said pendulum and included in said circuit, said switch operating automatically to momentarily close and then open said circuit during certain swinging movements of the pendulum, a movable element carried by and forming part of the animated display card, and a motion transmitting extension connected between the pendulum and said movable element.

8. An electric motor, comprising an oscillating pendulum, a solenoid coil carried by a lower portion of the pendulum, a dry cell removably mounted on the pendulum, an armature lying along a portion of the arc of movement of the solenoid coil, a switch carried by the pendulum and automatically operated by certain movements of the pendulum, and wires forming an electric circuit compactly contained only on said pendulum and including the dry cell, the coil and the switch.

WILLIAM E. BLEDSOE, Jr.

REFERENCES CITED

The following references are of record in the file of this patent:

UNITED STATES PATENTS

| Number | Name | Date |
|---|---|---|
| Re. 21,579 | Gregory et al. | Sept. 24, 1940 |
| 1,923,146 | Ruckelshaus | Oct. 24, 1933 |